United States Patent Office 3,426,472
Patented Feb. 11, 1969

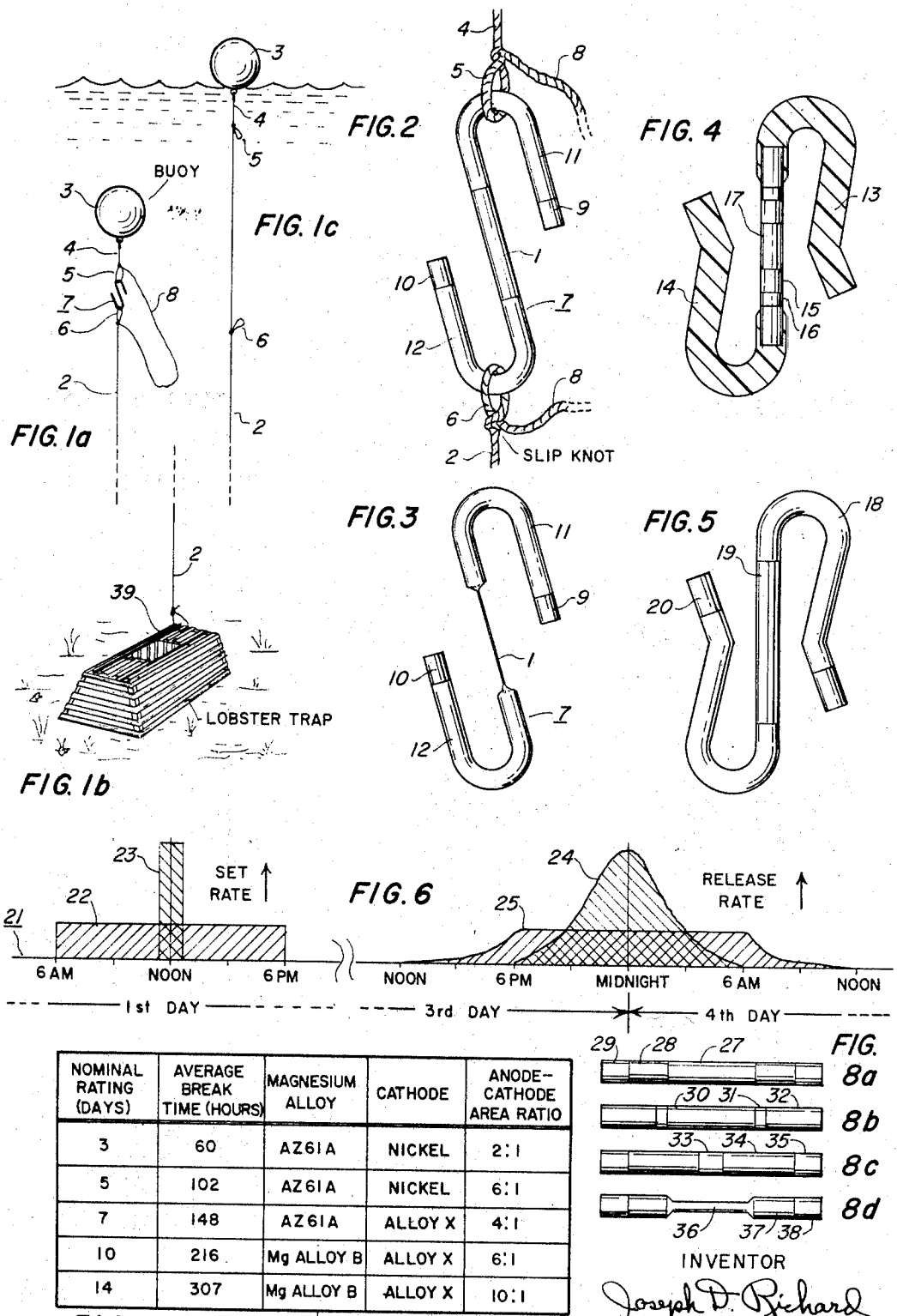

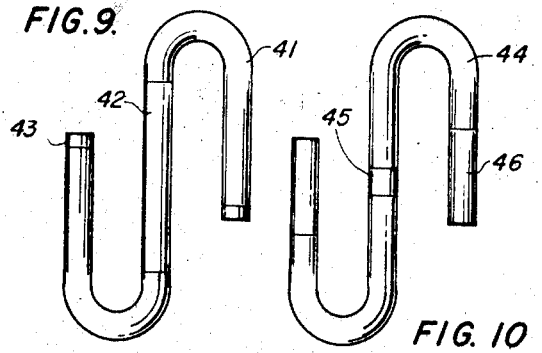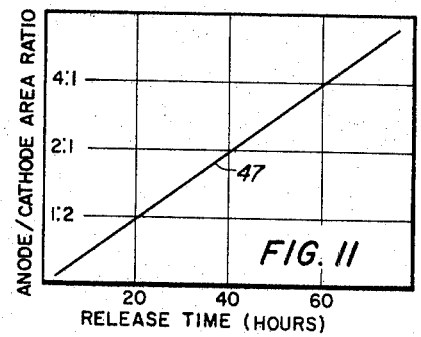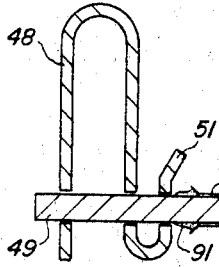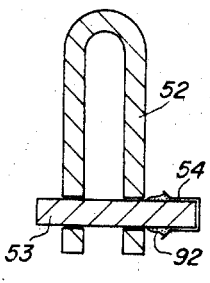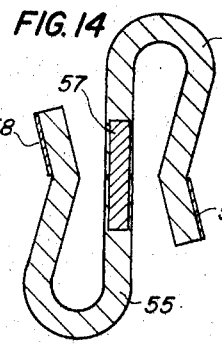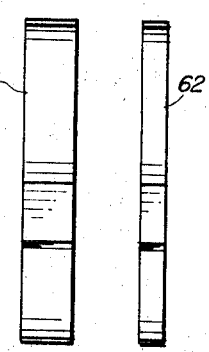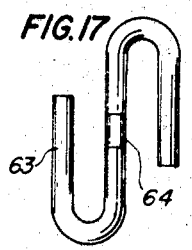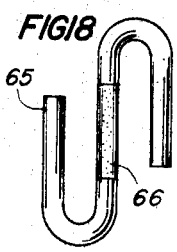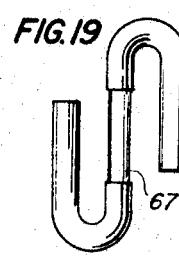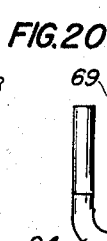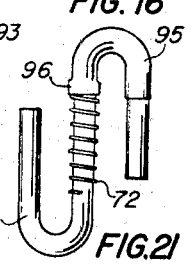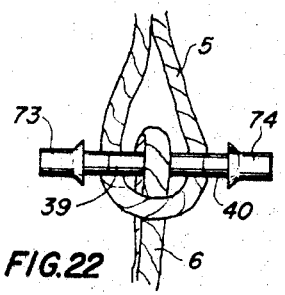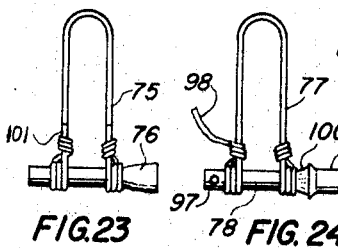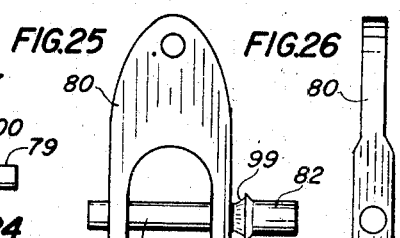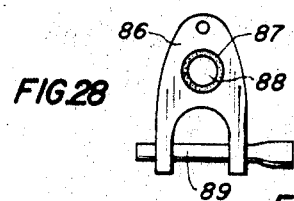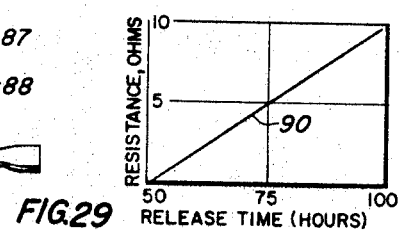
INVENTOR
Joseph D. Richard

3,426,472
DELAYED RELEASE DEVICE
Joseph D. Richard, 3613 Loquat Ave.,
Miami, Fla. 33133
Filed Apr. 26, 1967, Ser. No. 633,744
U.S. Cl. 43—100    10 Claims
Int. Cl. A01k 93/00, 69/06

ABSTRACT OF THE DISCLOSURE

A delayed release device comprising an expendable linkage for temporarily restraining the float or buoy of a lobster trap or the like beneath the sea surface for a predetermined time interval. The linkage device consists of a galvanic couple having a highly corrosive anode section which breaks after a predetermined period of immersion in seawater.

---

The present invention relates to improved techniques and apparatus for setting and recovering fish traps and the like. More specifically, the invention relates to a method and means for concealing the float or buoy of a fish trap or the like beneath the surface of the water for a predetermined period of time after setting. An expendable linkage device is provided for temporarily shortening the line between the float and trap so that the float is restrained beneath the surface. The linkage device breaks after a predetermined period of immersion in seawater. After the expendable linkage device breaks, the unrestrained float rises to the surface so that the trap may be recovered.

In the past, a wide variety of traps have been used for the capture of fish, lobsters, and crabs. These traps almost invariably lie on the ocean floor and their recovery is effected by means of a line connected to a surface float or buoy. The surface float is almost essential for the location and recovery of the trap. However, the existance of an exposed surface float has made these traps subject to widespread poaching. In the lobster fishing industry this problem has become particularly serious. In some areas more than half of the total catch is lost to poachers. In many of the less civilized coastal areas of the world the poaching problem has completely frustrated all attempts to develop a lobster or crab fishing industry. In some countries the fishermen have partially overcome the problem by eliminating the float entirely. Thus the fishermen must rely on their memory to relocate their traps and on a long hooked pole to recover them. Of course this technique restricts the fishing to only the clear, shallow water areas and some of the more productive adjacent waters are completely unexploited.

The principal object of the present invention is to provide a method and means for restraining the float or buoy of a fish trap or the like beneath the surface of the water for a predetermined period of time. An expendable linkage device is provided which breaks after the predetermined period of immersion thus allowing the float to rise to the surface. Several methods are described for varying the break delay time. Any desired delay time between a few hours and a few weeks can be provided using the techniques presently described. In practice, however, it is preferable to provide a limited number of standard delay times so that the desired reproducibility and reliability can be assured. The fishermen are able to plan their trap set and recovery cycles around any one (or a combination) of these standard delay periods so that the trap recovery takes place as soon as possible after the emergence of the trap float.

The expandable linkage device includes a galvanic couple having anode and cathode sections composed of metals or metal alloys widely separated on the Galvanic Series. When immersed in seawater, the high potential difference between the anode and cathode sections of the couple result in the relatively rapid corrosion of the anode section. After a certain period of time the anode section is corroded through and the linkage device breaks at that point. If the combination of metals and alloys is carefully selected a variety of reproducible corrosion rates can be obtained.

A metal or alloy immersed in a solution containing its ions will assume its own characteristic steady state potential. These potentials vary widely with different metals. In a specific electrolyte such as seawater each metal will assume a steady state open circuit potential depending, among other things, on its position in the electromotive series and upon the concentration of its ions in seawater. A listing of such metals and alloys in the order of their respective open circuit steady state potentials when immersed in a particular electrolytic solution such as seawater is referred to as a Galvanic Series. If an electrical contact is made between any two of these metals or alloys current will flow between them. The intensity and direction of this galvanic current depends only partially on the open circuit potential difference between the members of the couple. The surface area exposed to the seawater and the polarization characteristics of each member of the couple also determine the magnitude of the galvanic current. The internal and external resistances in the galvanic circuit are also controlling factors.

When electrical contact is made between two members of a galvanic couple immersed in seawater current will flow between them because of their potential difference. The more active or less noble metal is the anode where chemical oxidation takes place. The less active or more noble metal is the cathode where chemical reduction takes place. The closed circuit between the two results in the anode potential shifting in a more noble direction with a corresponding increase in the metal oxidation reaction and decrease in the reduction reactions. On the cathodic member of the couple the potential shifts in the active direction with a corresponding decrease in the metal oxidation reaction and increase in the reduction reaction. The two metals polarize to about the same potential with the difference being equal to the IR drop through the electrolyte (seawater) portion of the circuit. If polarization is sufficiently large, then for practical purposes all the oxidation reactions and all the corrosion takes place at the anode member of the couple and all the reduction reactions on the cathode member. Hydrogen discharge is the predominant cathode reaction and the cathode metal does not take part in the metal oxidation reaction. The rate of corrosion of the anode metal is, however, dependent on the ability of the cathode metal to allow the hydrogen discharge to proceed. For example when a magnesium anode and nickel cathode are electrically connected and immersed in seawater the following (somewhat simplified) reactions take place:

Oxidation (anode reaction) $Mg = Mg^{++} + 2e$
In solution $2H_2O = 2H^+ + 2OH^-$
Do $Mg^{++} + 2OH^- = Mg(OH)_2$
Reduction (cathode reaction) $2H^+ + 2e = H_2\uparrow$ (gas)

The combined reaction is:

$$Mg + 2H_2O = Mg(OH)_2 + H_2\uparrow \text{ (gas)}$$

The standard electrode potentials at 25° C. (in volts) are:

Magnesium $(Mg = Mg^{++} + 2e)$ 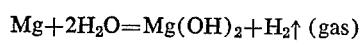 −2.37
Nickel $(Ni = Ni^{++} + 2e)$ −0.25

In the above described galvanic couple the magnesium anode corrodes and the nickel cathode receives cathodic protection. Hydrogen is evolved at both electrodes. With the proper combination of magnesium alloy and cathodic metal, such as described herein, the combination of hydrogen evolution and oxide solubility is sufficient to prevent the buildup of corrosion products on the electrodes. Such corrosion products, if they persist and accumulate, can build up layers of high resistance between the electrodes so that the corrosion process is virtually halted. For this reason, only very specific metal and alloy combinations can be used if reasonably accurate and reproducible break times are to be achieved. The ratio of anodic and cathodic areas exposed to the seawater is an important factor in controling the corrosion rate. For example, decreasing the anode area and increasing the cathode area will increase the corrosion rate of the anode. The importance of this relationship is stressed because the adjustment of the anode/cathode area ratio is used in the present invention to obtain fine variations in corrosion rate after the gross rate is established by linkage size and configuration, anode cross section, and (most important) the proper selection of anodic and cathodic materials.

When a galvanic couple such as described above is incorporated into an expendable linkage device according to the present invention, the anodic portion of the linkage will break through after a predetermined number of hours of immersion in seawater. Both water temperature and velocity affect the corrosion rate. The velocity effect approaches saturation at water velocities normally encountered in the ocean environment and so this effect is considered fixed and predetermined. The average break time for the release devices described herein refers to their use in ocean water having a temperature intermediate between the high and low extremes encountered in trapping lobsters in northern and tropic waters. A correspondingly slower corrosion rate and longer time to release will result when the devices are used in colder water and a correspondingly faster corrosion rate and shorter time to release will result when the devices are used in warmer water. Of course it is entirely practical to adjust the corrosion rate, as described herein, to achieve the desired average break time for any anticipated water temperature. For example, the most popular delay time (the nominal 3 day; average 60 hour break time) units can be made available in two slightly modified versions; one for the Maine Lobster (and other cold water) fisheries and another for the Spiny Lobster (and other tropical) fisheries.

FIGURES 1a, 1b and 1c show how an expendable delayed release device according to the present invention is used to restrain the float of a lobster trap beneath the surface for a predetermined period of time.

FIGURE 2 shows an S hook type of delayed release device immediately after immersion.

FIGURE 3 shows the same delayed release device immediately before breaking.

FIGURE 4 shows another S hook type of delayed release device having plastic end sections.

FIGURE 5 shows another version of the S hook type of delayed release device.

FIGURE 6 shows the time relationship between setting and release of a series of trap floats when using delayed release devices according to the present invention.

FIGURE 7 shows some of the characteristics of several standard delay ratings for the delayed release devices.

FIGURES 8a, 8b, 8c and 8d show several methods for varying the anode/cathode area ratio for the delayed release devices.

FIGURE 9 shows another variation of the S hook configuration with a large anode/cathode area ratio.

FIGURE 10 shows the same S hook configuration as FIG. 9 with a small anode/cathode area ratio.

FIGURE 11 shows variations in release time obtained by varying the anode/cathode area ratios in the manner shown in FIGURES 9 and 10.

FIGURE 12 shows a pin type delayed release device used with an aluminum shackle.

FIGURE 13 shows a pin type delayed release device used with a plastic shackle.

FIGURE 14 shows an S hook type release device made of extruded aluminum and held together by a keyed magnesium alloy center section.

FIGURES 15 and 16 show how the extruded type S hook of FIG. 14 may be cut to various thicknesses to obtain any desired break time.

FIGURE 17 shows a very long delay release device composed principally of zinc onto which is plated a relatively large cathode area.

FIGURE 18 shows an alternate type delayed release device in which multiple cathodic particles are dispersed throughout the magnesium anode portion.

FIGURE 19 shows an alternate type of construction in which a cathodic powder is heavily dispersed throughout a plastic matrix coating each end of an S hook.

FIGURE 20 shows an anodic S hook and cathodic ring combination.

FIGURE 21 shows an anodic S hook having a cathodic wire wrapped around the center section.

FIGURE 22 shows a pin type delayed release device used to secure directly two loops in a trap float line.

FIGURE 23 shows a cathodic wire shackle and magnesium pin combination.

FIGURE 24 shows an aluminum wire shackle used with a pin type delayed release device.

FIGURES 25 and 26 show a reusable plastic shackle for use with the pin type delayed release device.

FIGURE 27 shows an alternate cathode configuration for the pin type release device.

FIGURE 28 shows a reusable shackle of metal having its centrally disposed cathode electrically isolated by a ring of relatively low resistance conductive plastic. A plain magnesium pin is used in this combination.

FIGURE 29 shows variations in release time obtainable with various resistance values for the device shown in FIG. 28.

Returning again to FIGURES 1a, 1b and 1c, a lobster trap 39 is shown connected to the float 3 by means of a line having a lower portion 2, upper portion 4, and intermediate portion 8. An upper loop 5, preferably permanent, is located at the lower end of the upper portion 4 of the line. A lower loop 6, preferably a temporary slip knot, is located at the upper end of the lower portion 2 of the line. FIGURE 1a shows the upper loop 5 and the lower loop 6 held together by the S hook type delayed release device 7 so that the intermediate portion 8 of the line hangs freely in the water. A loop spacing is selected (by proper placement of the slip knot in the lower portion 2) so that the overall length of the line will be reduced to about six feet less than the water depth. Thus the float 3 will be restrained below the surface. In FIGURE 1c the delayed release device 7 has broken so that the float 3 is allowed to rise to the surface.

FIGURE 2 shows the delayed release device 7 in greater detail immediately after immersion. The release device 7 consists of an S hook holding upper loop 5 and lower loop 6 together. This S hook is formed from a rod of suitable magnesium alloy having a circular cross section of 3/32 inch diameter. Metal caps 9 and 10 of a suitable cathodic material, for example nickel, cover each end section of the S hook. The center section 1 of the S hook is exposed magnesium alloy. Upper and lower intermediate sections 11 and 12 are coated with a plastic paint which slightly overlaps the cathodic end sections 9 and 10. Active corrosion takes place only on the exposed center section 1.

FIGURE 3 shows the delayed release device 7 after its rated time has elapsed. The center section 1 has corroded down to the breaking point.

FIGURE 4 shows a partly sectioned view of an alternate construction for the delayed release device wherein a straight length of magnesium rod is cemented between two hook shaped plastic end sections 13 and 14 to form an S hook. Before assembly, metallic bands are plated on the magnesium rod to form a galvanic couple having the desired characteristics. This is done by successively masking selected areas during a two step plating operation. As a result, the center section 17 is exposed magnesium alloy. The lower cathode ring section 16 and the corresponding upper cathode ring section are nickel plating on a zincate undercoat. The lower intermediate section 15 and the corresponding upper intermediate section are exposed zincate undercoat. The exposed zincate bands separating the anodic and cathodic areas protect the anode section from excessive and localized corrosion which would occur immediately adjacent the cathode if the anode/cathode interface were exposed to seawater. The end portions, cemented into the plastic hooks, are also zincate coated.

FIGURE 5 shows an S hook configuration having a body of magnesium alloy formed from a rod having, for example, a circular cross section of 3/16 inch diameter. End sections, such as the upper end 20, are of nickel plating on a zincate undercoat. Intermediate sections, such as the upper intermediate section 18, are of exposed zincate undercoating. The center section 19 is of exposed magnesium alloy. The relatively large area of exposed zincate undercoat separating the anode and cathode sections serves as a buffer zone which reduces the corrosion rate of the anode section. The corrosion rate may be increased by increasing the width of the cathodic end sections and/or decreasing the width of the anodic center section. Conversely, the corrosion rate may be decreased by reducing the width of the cathodic end sections and/or increasing the width of the anodic center section. It may be readily seen that such adjustments of the anode/cathode area ratio may be made by appropriate masking operations prior to each stage of the plating process.

FIGURE 6 shows two extremes of possible rate paterns for the setting of traps and releasing of floats using delayed release devices having an average break time of 60 hours. In a first set rate pattern 23 the fully prepared traps are dropped in rapid succession from a high speed boat. As a result, they all enter the water at almost the same time as shown around noon of the first day. The resulting release rate pattern 24 is shown as a normal distribution curve centered at midnight preceeding the fourth day. Trap recovery and resetting takes place throughout the fourth day. In a second set rate pattern 22 the traps are recovered, re-baited, and reset with delayed release devices at a uniform rate throughout the daylight hours of the first day. The resulting release rate pattern 25 shows a corresponding spread in the release times although still centered at midnight preceeding the fourth day. A few trap floats emerge while it is still daylight toward the end of the third day. A few trap floats are still submerged at the beginning of the fourth day. Problems associated with the latter situation above are eliminated by the normal procedure of setting and recovering the line of traps in the same sequence. Thus most of the trap floats are released during the night preceeding the day of recovery. The very few trap floats still submerged at dawn of the recovery day will all be released before their scheduled recovery in the afternoon.

FIGURE 7 shows five standard periods for trap float releases of the type shown in FIGURE 2 above. The nominal rating in days is shown in the first column of the table 26. As described previously, a nominal 3 day unit would be used where recovery is planned on the fourth day. The day of setting is considered as the first day. Because of the spread in the release time (here about ±6 hours) the ideal average break time is 60 hours for this unit. This is the optimum compromise which minimizes the number of floats released during daylight of the third day and also the number of floats still submerged during the early morning of the recovery day. Similar ideal average break times are shown for the other nominally rated units of 5, 7, 10, and 14 days with an added safety factor applied to compensate for the ±10% variability in corrosion rate inherent in these devices. This insures that virtually all floats will be released sometimes before their scheduled recovery time. Other columns show magnesium alloy anode and cathodic metal combinations along with the corresponding anode/cathode area ratios required to achieve the desired break time. For example the nominal 3 day unit has an anode section of AZ61A magnesium alloy (3/16 inch diameter) and a cathode section consisting of nickel plated on a zincate substrate. An anode/cathode area ratio of about 2:1 provides an average break time of approximately 60 hours for the configuration shown in FIGURE 5 where a wide zincate buffer zone separates the anode and cathode sections. Similarly, an anode/cathode area ratio of 6:1 provides an average break time of approximately 102 hours which is about optimum for the nominal 5 day unit. Other combinations of less active magnesium alloys and/or less noble cathodic alloys are used to obtain the longer average break times required for the 7, 10, and 14 day nominally rated units. Corresponding anode/cathode area ratios are shown in the last column.

FIGURES 8a, 8b, 8c and 8d show several methods for adjusting the corrosion rate of the anodic center section of pin type delayed release devices by varying the anode/cathode area ratios and also by varying the width of the intermediate buffer zone between the anodic and cathodic sections. FIGURE 8a shows cathodic end sections 29, anode center section 27, and intermediate buffer sections 28. FIGURE 8b shows how the cathode end sections 32 are increased in area with a corresponding reduction in the width of the intermediate sections 31 to obtain a greatly increased corrosion rate for the anode center section 30. An alternative method is shown in FIGURE 8c for increasing the corrosion rate as compared to FIGURE 8a. The areas of the cathodic end sections 35 remain the same as in FIGURE 8a but an increased corrosion rate is obtained by reducing the area of the anode center section 33. This increased corrosion rate is partially offset by the increased width of the intermediate sections 34. Another alternate method for decreasing the break time of the delayed release device is shown in FIGURE 8d. Here the relative width of the cathode end sections 38, intermediate sections 37, and anode center section 36 remain the same as in FIGURE 8a. However a reduced break time is obtained by reducing the cross section diameter of the anode section 36. In the several anode/cathode configurations shown in FIGURES 8a, 8b, 8c and 8d the intermediate sections between anode and cathode can be either an exposed band of zincate coating or else a band of plastic paint or other suitable insulation.

FIGURE 9 shows an alternate construction for the S hook type of delayed release device. The body consists of a rod of suitable magnesium alloy formed into an S hook. A plating of cathode metal covers the end portions 43. The cathodic metal can be applied by electroplating, spray metallizing, or, if nickel is used, by an electroless plating process. The anode center section 42 is exposed magnesium alloy. Sections of shrinkable plastic tubing 41 cover the intermediate portions of the S hook between the anode and cathode sections. The shrinkable tubing has been positioned to provide a 7:1 anode/cathode area ratio.

FIGURE 10 shows an S hook delayed release device similar to FIGURE 9 except that the shrinkable plastic tubing 44 is positioned closed to the center thus exposing relatively more cathode section 46 and relatively less anode section 45. Thus the device shown in FIGURE 10 has a much shorter break time than has the device shown in FIGURE 9 even though they are made of identical parts. An anode/cathode area ratio of 1:7 is shown in FIGURE 10.

FIGURE 11 shows the relationship 47 between anode/cathode area ratios and expected release time for delayed release devices similar to the ones shown in FIGURES 9 and 10.

FIGURE 12 shows a sectional view of an extruded aluminum shackle 48 through which a magnesium alloy pin 49 is inserted. A metal cap 50 of a suitable cathode material covers one end of the magnesium pin 49. A band of plastic 91 isolates the anode/cathode interface from exposure to sea water. An upturned end 51 of the shackle 48 serves to lock the pin in place after insertion.

FIGURE 13 shows a sectional view of an extruded plastic shackle 52 through which a magnesium alloy pin 53 is inserted. A cup shaped metal cap 54 of suitable cathodic material covers one end of the pin 53. A plastic ring 92 covers the interface area between anode and cathode.

FIGURE 14 shows a sectional view of an extruded aluminum S hook wherein the upper and lower halves 55 and 56 of the S hook are keyed together by a magnesium alloy insert 57 of rectangular cross section. Strips of cathodic metal 58 and 59 are applied to the outer surface of the ends of the upper and lower halves 55 and 56 of the S hook. As this configuration of the release device is extruded and assembled in long sections, the cathode surfaces 58 and 59 are applied to the aluminum by spray metallizing. Iron is a suitable cathodic material. A conductive cement should be used between the magnesium spline 57 and the aluminum hook ends to assure a low resistance electrical contact.

FIGURES 15 and 16 show how the assembled extruded sections of FIGURE 14 may be cut to various widths to provide the desired break times. As only the edges of the magnesium insert are exposed to the seawater, the break time will increase with the width of the section. The wide section 61 will have a much longer break time than will the narrow section 62.

FIGURE 17 shows an S hook having a zinc body. The exposed zinc anode section 64 has a small surface area compared to the cathode sections 63 which consist of an electroplating of very noble metal. Although sometimes useful for long delay periods, the zinc anode type release device is generally unsatisfactory because the corrosion products on the surface of the zinc result in very poor reproducibility of breakage time. As an alternative to the zinc anode section, various magnesium/zinc alloys may be used (up to 40% zinc) to obtain shorter and more reproducible delay periods.

FIGURE 18 shows another alternate construction of delayed release device in which a cathodic metal powder is evenly dispersed throughout the magnesium alloy body of the S hook. Either nickel or iron powder is suitable. End sections 65 are painted. The particles of cathodic powder serve as multiple cathodes and the corrosion rate of the exposed matrix is proportional to the concentration of metal powder. As an alternative, a straight section of the magnesium alloy containing the dispersed cathodic powder can be cemented between two plastic hook sections as described previously in FIGURE 4.

FIGURE 19 shows a magnesium alloy S hook having an exposed center section 67 as an anode surface. The ends of the S hook are coated with a plastic material 68 impregnated with a mixture of iron and zinc powder. The concentration of metal powder should be about 85% by weight. The metal impregnated plastic 68 serves as the cathode surface. The corrosion rate is increased by increasing the relative concentration of iron powder in the matrix. The internal electrical resistance of the matrix is difficult to control precisely. Therefore there is generally an excessive variability in corrosion rate for this type of release device.

FIGURE 20 shows a magnesium alloy S hook having an exposed center section 69, a zincate coated upper hook section 93, and a zincate or plastic coated lower hook section 94. A metal ring 70 of a suitable cathode material is mechanically coupled to the upper end of the S hook. The ring 70 serves as the cathode section of the galvanic couple. Stainless steel, Monel, or Hastelloy are examples of suitable materials for the ring cathode. The ring is reusable and is permanently secured to the float line near the float so that it is equivalent to the upper loop 5 shown in FIGURE 1.

FIGURE 21 shows an S hook delayed release device having a magnesium alloy body 71. A wrapping of iron wire 72 around the mid-section serves as the cathodic member of the galvanic couple. The iron wire 72 is tightly secured to the magnesium at the upper end 96. A plastic coating 95 covers the upper hook portion including the secured upper end 96 of the iron wire. Although the corrosion takes place mostly under the iron wire, electrical contact between anode and cathode members is maintained under the plastic coated upper end 96 so that the corrosion continues until the linkage is broken. The anode/cathode interface areas are in contact with the seawater in this configuration. Accelerated and localized corrosion takes place under the contact areas resulting in relatively poor reproducibility as compared to most of the other S hook release devices described herein.

FIGURE 22 shows how a pin type delayed release device is used to secure the upper loop 5 and the lower loop 6 in the trap float mooring line of FIGURE 1. A magnesium alloy pin 39 is capped on each end by nickel (or nickel plated steel) cathode members 73 and 74. Plastic bands 40 protect the anode/cathode interface areas from seawater. As an alternative an exposed band of zincate undercoating extending out from under the cathode end caps 73 and 74 can be used in place of the plastic bands 40 shown. Obviously only one cathode member is required but a more even corrosion rate along the length of the pin 39 is obtained by using two cathodic end caps. As an alternative to the use of metal end caps, electroplating, electroless plating, spray metallizing or other metal coating technique may be used to apply a section of cathodic surface to the magnesium alloy pin.

FIGURE 23 shows a wire shackle 75 of iron (or other suitable cathodic metal) through which is inserted a magnesium alloy pin 76. As mentioned previously, it is generally undesirable to have the anode/cathode contact area exposed to the seawater. Therefore the lower ends 101 of the iron wire shackle 75 should be galvanized including the portions in contact with the magnesium pin 76.

FIGURE 24 shows an aluminum wire shackle 77 through which a magnesium alloy pin 78 is inserted. A cathodic metal end cap 79 covers one end of the pin 78. A band 100 of insulating plastic or wax protects the anode/cathode interface area. A wire ending 98 from the wire shackle 77 projects freely so that it can be used to lock the pin in position by insertion through the hole 97. The aluminum wire does not appreciably affect the reaction characteristics of the galvanic couple.

FIGURES 25 and 26 show a plastic schackle 80 through which a magnesium alloy pin 81 is inserted. A cathodic metal end cap 82 covers one end of the pin 81. A band of insulating material 99 covers the anode/cathode interface area. The shackle 80 is reusable so that only the capped magnesium pin 81 is expanded.

FIGURE 27 shows an alternate type of expendable pin for the plastic shackle shown in FIGURE 25. An iron wire 84 is tightly secured to one end of the magnesium alloy pin 83. A plastic coating 85 covers the area of wire attachment.

FIGURE 28 shows a metal shackle 86 of aluminum through which a magnesium pin 89 is inserted. A cathodic disk 88 is centered in a recess in the shackle 86. An annular ring 87 of conductive plastic surrounds the cathodic disk 88. The conductive plastic has a predetermined low electrical resistance. The aluminum shackle is anodized and painted. Sleeve inserts having low electrical resistivity and low galvanic nobility within the two legs of the shackle 86 assure good electrical contact between the body of the shackle 86 and the magnesium alloy pin 89. The high electrical resistivity of aluminum oxide makes it necessary to interpose a sleeve of other metal of low resistance and low nobility around the areas of contact with the magnesium pin 89. As an alternative, a galvanized shackle of other metal may be used. The shackle portion 86 of the release device is relatively complicated and expensive but is reusable. Only the simple magnesium pin 89 is expended.

FIGURE 29 shows the relationship 90 between the electrical resistance of the annular ring 87 of FIGURE 28 and the corrosion break time of the magnesium pin 89.

It may be seen therefore that a wide variety of expendable linkage devices may be constructed each coming within the object and scope of the present invention. However, all of them in common are characterized by:

(1) A linkage device capable of temporarily securing together an upper and lower portion of a trap float line to restrain the float beneath the sea surface.

(2) An anode section within the body of the linkage device of a metal alloy highly active in the galvanic series. The anode section is disposed so that when it is corroded through, the linkage device releases the temporarily secured upper and lower portions of the trap float line.

(3) A cathode section in electrical contact with the aforementioned anode section. The cathode material must be of a metal or alloy having a substantially higher nobility in the galvanic series compared to the anode section. The cathode section may be either a metallic coating applied directly to an extension of the anode section or else a separate member electrically and mechanically connected to the anode section.

(4) If highly reproducible break time are required, means should be included for protecting the anode metal alloy from corrosion immediately adjacent its contact area with the cathode section. This may be done by coating a portion of the anode section immediately adjacent the cathode section or else by interposing a less active conductive material between the anode and cathode sections.

(5) The material and construction costs of the expendable linkage devices must be extremely low so that they will be economically practical for the average fisherman.

Expendable release devices as described herein should have consistently reproducible break times. Furthermore means must be available during the manufacturing process to adjust the physical characteristics of these devices so that the end product will have the desired average break time. Physical parameters which affect the break time and which are adjustable during the manufacturing process include:

(1) Anode material (corrosion rate increases with activity of alloy).
(2) Cathode material (corrosion rate increases with nobility of metal or alloy).
(3) Anode/cathode area ratio and total exposed electrode areas (corrosion rate decreases with increasing anode/cathode area ratio).
(4) Cross sectional dimension of anode section.
(5) External circuit resistance (corrosion rate decreases with increasing seawater path length between electrodes).
(6) Internal circuit resistance (corrosion rate greatly decreased by increasing internal electrical resistance between electrodes).

Environmental factors which will affect the break time and which therefore should be taken into account during the manufacturing process include:

(1) Water temperature (considered as constant for a given geographical area and season).
(2) Water velocity (considered as a constant value approaching the effective saturation point).
(3) Chemical composition of seawater (considered constant).

A wide variety of metal and alloy combinations may be used as electrode materials in the construction of the delayed release devices described herein. One preferrd magnesium alloy for the anode section includes 6% aluminum, 2% zinc, and 0.2% manganese. The zinc and manganese tend to eliminate the adverse effect of iron, nickel, and copper impurities usually present in the magnesium. A commonly available magnesium alloy AZ61A has also proven to be satisfactory. Other magnesium alloys which have been used successfully include AZ63A and AZ31B. Many cathodic metals and alloys are available. Nickel and nickel alloys have proven to be satisfactory. Iron and iron alloys have also been used successfully.

For ordinary fish trap floats the cross sectional diameter of the anode section of the delayed release device would be between 5/32 inch and 1/4 inch. Of course much heavier release devices can be constructed where required for larger floats and lines or for longer delay periods. More reproducible break times are obtained when the linkage device has a configuration which places only a tension strain on the corroding anode section. This is more nearly realized when the S hook configuration is used. The S hook type of linkage has a further advantage in that it is easier to handle and attach to the float line than are most of the other linkage types. This advantage is realized especially when the fishermen are wearing gloves as they normally do.

Several basic techniques are available for applying the metallic cathode material onto the expendable linkage device. The electroplating process comprises an initial application of a zinc immersion coating followed by copper striking afterwhich the desired cathode metal is electroplated onto the zincate-copper substrate. An electroless nickel plating process is available in which nickel is chemically deposited on the magnesium following a preliminary etch treatment. Spray metallizing may also be used to apply cathodic material. Metals and alloys may be applied either singly or in combination to obtain the desired degree of nobility.

Many modifications and alternate constructions are possible for the delayed release devices described herein. For example, a relatively wide (or multiple) cathodic area may be applied to the linkage devices and subsequently covered with easily removable tape. Various predetermined release delay periods may be obtained by removing the predetermined appropriate amount of tape and thus exposing the appropriate cathodic area. Although rod material is used to form most of the S hook release devices described herein, it is obvious that magnesium alloy S hooks (or other shaped linkages) may be formed by extrusion and then cut into sections. Although the S hook release devices are shown with two cathodic areas, it should be realized that only one is required. However, a symmetrical disposition of the cathodic sections relative to the anodic section results in more even corrosion of the anode and a more reproducible break time.

FIGURE 1 shows one method of using the release device wherein a bight (or loop) in the float mooring line is stopped off. The bight (or loop) hangs freely in the water. This presents no problems in areas having only a limited tidal range. However, in areas having large tidal fluctuations the length of the bight (or loop) 8 would have to be excessive and therefore subject to fouling. Therefore a preferred method of use in such areas is to use a float or buoy which is shaped like a spool or reel. When setting the trap, an appropriate length of the mooring line is wound around the spool/float to insure submersion at the lowest tide. The spool/float is then attached to a loop in the lower part of the line with the delayed release device. When the release device breaks, the spool/float unwinds and rises to the surface.

What is claimed is:

1. Apparatus of the character described comprising:
   a linkage device, said device being suitable for securing together upper and lower portions of a trap float line assembly;
   a metallic anode member comprising at least a portion of the said linkage device, said member having at least a partially exposed surface and a substantially high galvanic activity when immersed in sea water; and
   a metallic cathode member attached to the said linkage device and electrically coupled to the said anode member, said cathode member having at least a partially exposed surface which is relatively noble galvanically when immersed in seawater, said anode and cathode members thus comprising a galvanic couple characterized by the relatively rapid corrosion of the said anode member so that the said linkage device becomes separated after a predetermined period of immersion in seawater.

2. Apparatus as described in claim 1 wherein said anode member is a section of magnesium alloy; and said cathode member is a cathodic metal coating applied to a portion of the said anode member.

3. Apparatus as described in claim 1 wherein an insulating coating covers a portion of the said linkage device between the aforementioned exposed portions of the said anode and cathode members.

4. Apparatus as described in claim 1 wherein the said anode member is a section of magnesium alloy separated from the said cathode member by an intermediate metal portion, the surface of which has a galvanic activity intermediate between the aforementioned anode and cathode activities.

5. A delayed release linkage device for securing a float or buoy of a lobster trap or the like beneath the sea surface for a predetermined period of time which comprises:
   upper and lower hook sections suitable for securing together upper and lower portions of a trap float line assembly; a center section disposed between and connecting said upper and lower hook sections, said center section including a metallic anode member having at least a partially exposed surface and a substantially high galvanic activity when immersed in seawater; and
   a metallic cathode member attached to the said center section and electrically coupled to the said anode member, said cathode member having at least a partially exposed surface which is relatively noble galvanically when immersed in seawater, said anode and cathode members thus comprising a galvanic couple characterized by the relatively rapid corrosion of the said anode member so that the said upper and lower hook sections become separated after a predetermined period of immersion in seawater.

6. Apparatus as described in claim 5 wherein said linkage device comprises an anodic magnesium alloy S hook; said cathode member comprises a cathodic metal cup covering at least one end of the said S hook; and further characterized by a plastic sleeve covering at least the portion of the said S hook adjacent the said cathodic metal cup.

7. Apparatus as described in claim 5 wherein said upper and lower hook sections are of plastic; said center section is a segment of magnesium alloy; and said cathode member is a metallic coating applied to a portion of the said center section.

8. Apparatus as described in claim 5 wherein at least the said center section is composed of a magnesium alloy; and the said cathode member comprises a cathodic metal powder dispersed throughout the said magnesium alloy.

9. Apparatus as described in claim 5 wherein the said linkage device comprises an anodic magnesium alloy S hook; said cathode member comprises a metal coating applied to at least one portion of the said S hook; and further characterized by a protective coating covering at least a portion of the said S hook between the exposed portions of the said anode and cathode members.

10. The method of temporarily securing a fish trap float or the like from predation by poachers which comprises: connecting together upper and lower portions of a trap float line assembly with an expendable linkage device constructed at least partially of a metal anode member having substantially high galvanic acivity when immersed in seawater, to which is electrically connected a metal cathode member having a relatively low galvanic activity when immersed in seawater, said anode and cathode members thus comprising a galvanic couple characterized by the relatively rapid corrosion of the said anode member so that the said linkage device separates after a predetermined period of immersion in seawater.

References Cited

UNITED STATES PATENTS

| | | | |
|---|---|---|---|
| 457,174 | 8/1891 | Ward | 9—9 |
| 2,163,973 | 6/1939 | Benca et al. | 43—100 |
| 2,329,117 | 9/1943 | Henderson et al. | 43—43.12 |
| 2,903,718 | 9/1959 | Wright | 43—23 X |
| 3,055,139 | 9/1962 | Condello | 43—102 X |

WARNER H. CAMP, *Primary Examiner.*